United States Patent [19]
Bauer et al.

[11] Patent Number: 5,814,955
[45] Date of Patent: Sep. 29, 1998

[54] MOTOR CONTROL CIRCUIT WITH A LOW VOLTAGE MONITOR

[75] Inventors: Michael E. Bauer, Hartland; Michael A. Urbassik, Milwaukee, both of Wis.

[73] Assignee: Eaton Corporation, Cleveland, Ohio

[21] Appl. No.: 818,186

[22] Filed: Mar. 14, 1997

[51] Int. Cl.[6] ................................................ H02P 3/14
[52] U.S. Cl. ...................... 318/376; 318/432; 361/232
[58] Field of Search .................. 318/432–434, 318/375–381; 361/23, 30, 31, 33, 88, 90–92

[56] References Cited

U.S. PATENT DOCUMENTS

| | | | |
|---|---|---|---|
| 3,719,859 | 3/1973 | Frantz et al. | 361/92 |
| 3,771,043 | 11/1973 | Zulaski | 320/137 |
| 4,042,069 | 8/1977 | Ohira et al. | 187/296 |
| 4,165,801 | 8/1979 | Watanabe et al. | 187/297 |
| 4,331,995 | 5/1982 | Voss | 361/85 |
| 4,517,502 | 5/1985 | Aschoff et al. | 318/474 |
| 4,584,623 | 4/1986 | Bello et al. | 361/90 |
| 4,902,954 | 2/1990 | Oshima et al. | 318/762 |
| 5,631,510 | 5/1997 | Flaig et al. | 310/77 |

*Primary Examiner*—Brian Sircus
*Attorney, Agent, or Firm*—Quarles & Brady

[57] ABSTRACT

A control circuit for an overhead crane motor includes a low supply voltage monitor to disconnect the motor from the control circuit and ensure brakes engage in the event of interruption of power supplied to the crane. A sensor circuit detects whether voltage supplied to the control circuit drops below a predefined threshold level which is greater than a voltage magnitude produced by the motorN operating in a regenerative mode during a power interruption. A switching circuit responds to sensing supply voltage below the threshold level by disconnecting electrical current to a relay coil which causes contacts to open which result in the motor being electrically disconnected from the control circuit. As a result of that disconnection, voltage produced by the motor operating in a regenerative mode does not inhibit electrically controlled mechanical brakes from engaging.

18 Claims, 2 Drawing Sheets

MOTOR CONTROL CIRCUIT WITH A LOW VOLTAGE MONITOR

FIELD OF THE INVENTION

The present invention relates to control circuits for electric motors, and more particularly to control circuits for an electric motor of an overhead crane.

BACKGROUND OF THE INVENTION

Overhead cranes are commonly used in factories to transport heavy objects and have a pair of parallel tracks which are spaced apart above the assembly floor. A crane bridge spans between the tracks with wheels that ride on the tracks. The wheels are driven by an electric motor which enables the bridge to move in either direction along the tracks. A trolley mounted on top of the bridge is driven by another electric motor in both directions along the bridge. The trolley contains a hoist which includes a block and tackle arrangement with a cable that extends from a reel on the trolley. A hoist motor turns the reel in opposite directions to raise and lower the block. Objects to be transported across the assembly floor can be attached to a hook on the block. For example, this type of crane is found in steel mills to transport buckets of molten metal.

Electrical power is supplied to the overhead crane via a series of rails called "collectors" which run along side one of the tracks. Wipers on the bridge called "collector shoes" contact the rails and conduct electric power to the motors and associated control circuitry on the bridge. The bridge typically includes a cab in which an operator sits to control the crane and the electric motors which move the bridge, trolley and hoist.

Because the crane carries relatively heavy objects above an assembly floor that is populated with workers and other items of equipment, safety is of great concern. It is possible that the electric power supplied to the rails could be interrupted while the crane is transporting a very heavy load. Without power, the load being transported begin to drop rapidly before an operator recognized the situation and manually stopped the hoist. This could result in damage to the load and injury to workers nearby. As a consequence, the hoist mechanism has an automatic brake which is activated when power is interrupted to the hoist motor circuit, thereby preventing the load from dropping to the assembly floor.

Therefore, it is important to provide devices which reliably detect when power to the crane hoist is interrupted. However, it was discovered that during such interruptions when the load is being lowered, the hoist motor can become a generator supplying electricity to the control circuit and brake. This voltage may be fifty percent of the nominal supply voltage which in some conditions complicates detection of a supply power interruption. The lowering speed at which this current regeneration problem occurs varies from hoist-to-hoist. The size of the load carried by the crane and resistors in the dynamic lowering circuit of the hoist determine the maximum current and voltage which can be generated during this failure condition.

SUMMARY OF THE INVENTION

A general object of the present invention is to add a voltage monitoring circuit that only applies power to a motor control relay when the voltage is within the limits required for proper crane operation as specified by standards of the National Electric Manufacturers Association. Thus during a regeneration condition, the relay contact will open and prevent voltage generated by the motor from affecting the automatic brake activating device.

Another object is to provide such a voltage monitoring circuit which does not rely simply on relay coils to detect and respond to an under voltage condition.

A further object of the present invention is to provide such a voltage monitoring circuit which can be substituted for or used in connection with the standard under voltage motor safety control found in present overhead cranes.

These and other objectives are satisfied by a control circuit for a crane motor that incorporates an improved low supply voltage monitor. That monitor includes a sensing circuit which detects whether voltage supplied to the control circuit drops below a threshold level, which is greater than the voltage produced by the motor operating in a regenerative mode during failure of the power supply, and below voltage levels which occur during normal operation of the crane motor. A switch circuit responds to the sensing circuit detecting a supply voltage below that threshold level by terminating electrical current flowing to a relay coil. That termination causes relay contacts to open which disconnects the crane motor from the control circuit.

With the motor disconnected, voltage produced by the motor operating in a regenerative mode during interruption of the power supply does not interfere with setting the safety brakes. Thus the brakes can engage to prevent the load from dropping precipitously during a power failure.

DETAILED DESCRIPTION OF THE INVENTION

Figure 1:
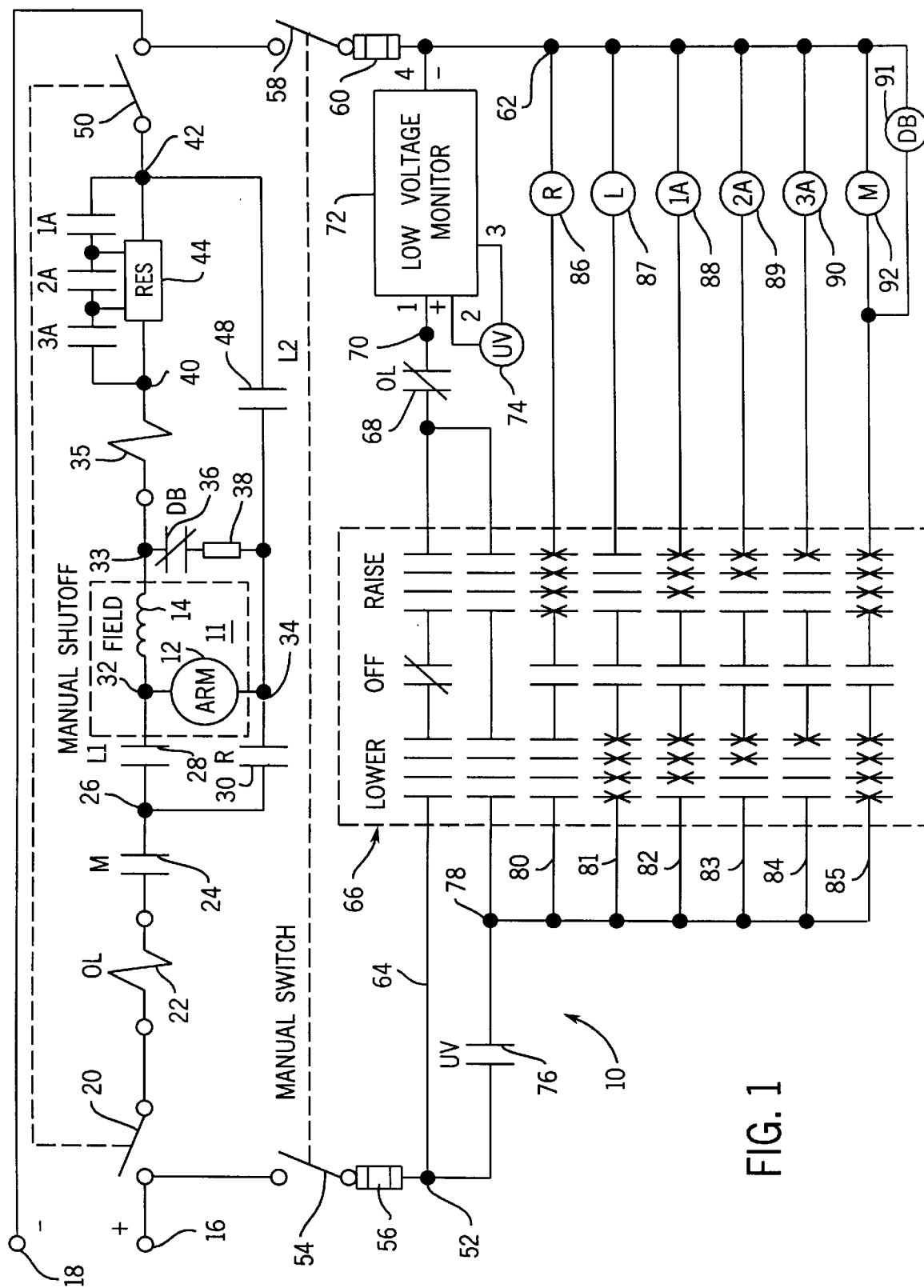
FIG. 1 is a schematic diagram of the hoist control circuit for an overhead crane.

With initial reference to FIG. 1, an overhead crane has a control circuit 10 which controls a direct current (dc) electric motor 11 for the hoist. This hoist motor 11 comprises an armature winding 12 and a field coil 14. DC power for the control circuit 10 and hoist motor 11 is applied to a pair of terminals 16 and 18. Terminal 16 is connected to a first manual shutoff switch 20 and a coil 22 of an overload protection relay which opens the associated contacts 68 when electric current through coil exceeds a safe level. A main relay contact 24, which closes when the operator activates the hoist, couples the overload protection device 22 to a first junction 26. A "lower relay contacts" (L1, L2) 28 and/or 48 a "raise" relay contact (R) 30 connect the first junction 26 to opposite terminals 32 and 34, respectively, of the motor's armature winding 12. The field coil 14 is connected between the first armature terminal 32 and a second junction 33. The conventional actuator 35 for the mechanical hoist brake is connected between the second junction 33 and a third circuit junction 40. When the actuator 35 is powered the mechanical hoist brake is disengaged to allow the hoist to move, and removal of power causes the brake to mechanically engage.

A dynamic brake relay contact 36 and a braking resistor 38 are connected in series between third junction 33 and second armature terminal 34. The braking relay contact 36 closes when both the lower relay contacts 28 and 48 and the hoist relay contact 30 are open to insert a braking resistance 38 in series with the armature winding 12 and field coil 14 of the hoist motor 11.

A multiple tapped resistor 44 is connected between third junction 40 and a fourth junction 42 with a series of relay contacts 1A, 2A and 3A connected between the resistor taps. Alternatively, individual resistors may be employed. As will be described, the selected closure of various relay contacts 1A, 2A and 3A couples different amounts of resistance in series with the hoist motor 11, thereby determining the magnitude of current and thus the motor speed. Another relay contact (L2) 48 is connected between the second terminal 34 of the armature winding 12 and the fourth junction 42 in lower position. The fourth junction 42 is connected by a second manual switch 50 which is ganged with the first manual switch 20 to shut-off electric current to the hoist motor 11 from power terminal 18.

The relay contacts of the circuit just described are magnetically operated by coils that are connected in branches of the control circuit 10 in the lower portion of FIG. 1. Power to that portion of the control circuit 10 is supplied from input terminals 16 and 18 to supply buses 52 and 62 through a pair of ganged manual shutoff switches 54 and 58 and fuses 56 and 60, respectively. A first control circuit branch 64 is connected between the supply buses 52 and 62 and comprises an element of the hoist control switch 66 that is located in the operator cab of the crane.

The hoist control switch 66 has a center-off position with four positions on each opposite side of center. Movement of an operator lever (not shown) moves to the hoist control switch 66 to one side of center to raise the hoist and movement in the opposite direction from center lowers the hoist. In each position of the operator lever to either side of center, various contacts of the hoist control switch 66 are opened or closed. These positions are designated by vertical lines in the different circuit branches 64 and 80–85 connected to the switch, with X's indicating that the associated circuit branch is conductive through the hoist control switch 66 in that position.

The first branch 64 of the control circuit also contains an overload relay contact 68 that couples the other side of the hoist control switch 66 to a fifth junction 70. The overload relay contact 68 is controlled by the overload coil 22. A low voltage monitor 72, according to the present invention as will be described subsequently, is connected between the fifth junction 70 and the second supply bus 62 of the control circuit. A coil 74 of an under voltage relay is connected to terminals 2 and 3 of the low voltage monitor 72.

Another section of the lower portion of control circuit 10 has an under voltage relay contact 76 which is connected between the first supply bus 52 and an intermediate bus 78. The under voltage relay contact 76 is operated magnetically by an under voltage relay coil 74. Six control branches 80–85 are connected between the intermediate bus 78 and the second supply bus 62 of the control circuit 10. In first control branch 80, contacts of the hoist control switch 66 are connected in series with a raise relay coil 86. The connection is such that the raise relay coil 86 is energized whenever the lever of the hoist control switch 66 is in any one of the raising positions. A second control branch 81 contains another set of contacts of the hoist control switch 66 connected to a lower relay coil 87 which is energized whenever the lever of the hoist control switch 66 is in any one of the lowering positions. The raise relay coil 86 closes relay contacts 30 to drive the motor armature 12 in a raising direction. When electric current is applied to the lower relay coil 87, relay contacts 28 and 48 close to send current through the motor armature 12 in a lowering direction. Thus, the operator by moving the hoist control switch 66 in either direction from the center-off position, can select whether the hoist is raised or lowered.

The speed of the hoist is determined by which ones of the resistor tap contacts 1A, 2A and 3A are opened and closed. The closure of the tap contacts 1A, 2A and 3A is governed by separate relay coils 88, 89 and 90 respectively. The first of these coils 88 is located in the third control branch 82. The second relay coil 89 for resistor tap contacts 2A is connected in a fourth control branch 83, while the fifth control branch 84 governs the application of electric current to the relay coil 90 associated with resistor tap contacts 3A. Each of these relay coils is energized by operation of the hoist control switch 66 into the positions indicated by the X's in the respective circuit branch.

A master relay coil 92 is connected in a final control circuit branch 85 and closes the master contacts 24 whenever the hoist control switch 66 is moved out of the center-off position. A dynamic brake relay coil 91 is connected in parallel with the master relay coil 92 and opens the dynamic brake contacts 36 when the hoist is being raised or lowered.

Figure 2:
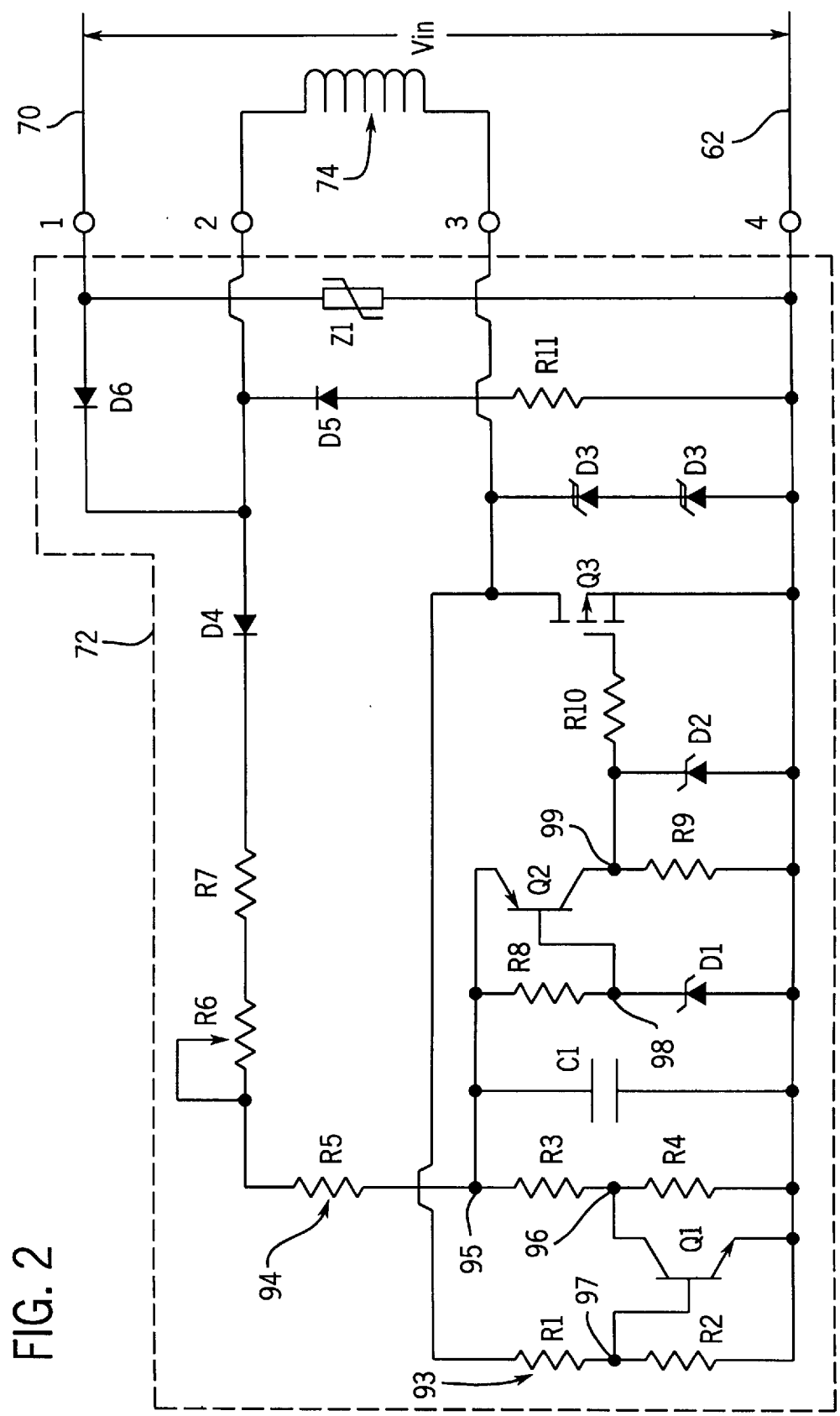
FIG. 2 is a tailed schematic circuit diagram of the low voltage monitor in FIG. 1.

FIG. 2 illustrates the details of the low voltage monitor 72. Input terminal 1 of the low voltage monitor 72 is connected at the fifth junction 70 to the overload relay contact 68 and input terminal 4 is connected to the second supply bus 62. A diode D6 couples terminal 1 to terminal 2 and prevents reverse DC potential from damaging the low voltage monitor 72. Additional protection is provided by a metal oxide varistor Z1 connected across terminals 1 and 4 to suppress high voltage transients that may be present at the hoist supply terminals 16 and 18.

Terminal 2 od the low voltage monitor 72 is connected by a diode D4 to a first voltage divider 94 comprising the series connection of resistors R3, R4, R5, R6 and R7 between that diode and terminal 4 of the low voltage monitor 72. Diode D4 prevents reverse dc potentials from damaging the low voltage monitor 72. Variable resistor R6 of the first voltage divider 94 is set to determine the threshold of the low voltage monitor 72, as will be described. Separate resistors R5 and R7 are used in series with variable resistor R6 to reduce power and voltage gradient requirements of the individual resistors. The first voltage divider 94 forms node 95 between resistors R3 and R5, and node 96 between resistors R3 and R4.

Terminal 3 of the low voltage monitor 72 is coupled to the terminal 4 by a second voltage divider 93 formed by resistors R1 and R2 with a node 97 therebetween. Node 97 is connected to the base of an NPN transistor Q1 that has an emitter connected to terminal 4. The collector of transistor Q1 is connected directly to node 96 in the first voltage divider 94.

A capacitor C1 is connected between node 95 and terminal 4 of low voltage monitor 72. Resistor R8 and a reverse biased Zener diode D1 also are connected in series between first voltage divider node 95 and terminal 4. A node 98 between resistor R8 and Zener diode D1 is coupled to the base of a PNP transistor Q2. The emitter of transistor Q2 is connected to node 95 and the collector is coupled at node 99 by resistor R9 to terminal 4 of the voltage monitor 72.

Resistor R10 connects the collector of transistor Q2 to the gate electrode of an output field effect transistor (FET) Q3. The collector of transistor Q2 also is connected to terminal 4 by a reverse biased Zener diode D2 to ensure that the potential applied to the gate of FET Q3 remains within reliable operating levels. The source-drain conduction path of FET Q3 is connected across terminals 3 and 4 of the low voltage monitor 72. In addition, a pair of clamping diodes D3 are connected between terminals 3 and 4 to prevent transients from the DC power supply or the fly-back discharge of under voltage relay coil 74 from damaging output FET Q3. The series connection of resistor R11 and the reverse biased diode D5 is connected across terminals 2 and 4 to provide a freewheeling path to dissipate the stored energy when the under voltage relay coil 74 is turned off. That energy will be dissipated in the series connection of diodes D3 and D5 and resistor R11, along with the internal resistance of under voltage relay coil 74. This dissipation results in a rapid turn-off of the under voltage relay coil 74.

The purpose of the low voltage monitor 72 is to apply power to under voltage relay coil 74 when the voltage across the supply terminals 16 and 18 is above an adjustable threshold limit and to remove the power to that relay coil when the voltage is below that threshold limit. As noted previously, when the coil 74 of the under voltage relay is energized, relay contacts 76 are closed thereby supplying power to control circuit branches 80 thru 85 in FIG. 1.

When electrical power is applied to the overhead crane control circuit 10, the second voltage divider 93, formed by resistors R1 and R2, applies a portion of the voltage that is across the output FET Q3 to the base-emitter junction of transistor Q1. When voltage across transistor Q3 exceeds a first threshold (100 volts for a supply voltage at terminals 16 and 18 of 250 volts dc), base current will be supplied which turns on transistor Q1 and effectively short circuits resistor R4.

The voltage across the series connection of resistors R3 and R4 in the first voltage divider 94 is applied across capacitor C1. When the input voltage $V_{in}$ across terminals 1 and 4 of the low voltage monitor 72 exceeds a second threshold (e.g. approximately 170 volts), the voltage across capacitor C1 will be greater than the breakdown voltage of Zener diode D1 and the series connected base-emitter junction of transistor Q2. This causes transistor Q2 to become conductive and apply voltage across resistor R9. The voltage across resistor R9 also is applied to the gate of the output FET Q3 through the series connected resistor R10. This causes output FET Q3 to turn-on and the input voltage to the low voltage monitor 72 will be transferred from across output FET Q3 to across under voltage relay coil 74, thereby closing the under voltage relay contacts (UV) 76.

Closure of the under voltage relay contacts 76 applies current to branches 80 thru 85 of the control circuit 10. Thereafter, operation of the hoist control switch 66 will activate the raise or lower relay coils 86 or 87 resulting in closure of the appropriate raise relay contact 30 or lower relay contacts 28 and 48.

The voltage across output FET Q3 drops as that transistor turns on. When that voltage falls below a given level (e.g. 100 volts) the base drive to transistor Q1 is terminated and transistor Q1 turns off. This action removes the short circuit across resistor R4 raising the voltage on capacitor C1 which further aids in keeping transistor Q2 in the conductive state. Thus, this action maintains the gate drive voltage on output FET Q3 which remains in the conductive state. With the short circuit removed across resistor R4, the voltage applied to C1 will be a larger percentage of the input voltage $V_{in}$ as defined by the resistance relationship:

$$\frac{R3 + R4}{R3 + R4 + R5 + R6 + R7} \quad (1)$$

as compared with the previous voltage level defined by the following resistance relationship when transistor Q1 was conductive:

$$\frac{R3}{R3 + R4 + R5 + R6 + R7}. \quad (2)$$

This means that the input voltage required to exceed the voltage breakdown of Zener diode D1 and the series connected base-emitter junction of Q1 will be reduced to a value greater than 165 volts in the present example. As long as the supply voltage across terminals 16 and 18 exceeds that third threshold (e.g. 165 volts), as set by variable resistor R6, output FET Q3 will be conductive, energizing the under voltage relay coil 74, which closes contacts 76 applying power to the six branches 80–85 of the hoist control circuit 10. Thus the hoist control switch 66 is able to energize the control circuit relays to operate the hoist motor 11.

If the power supplied to the crane is interrupted or reduced below a level at which operator commands can be executed by the control circuit, the input voltage $V_{in}$ across terminals 1 and 4 of the low voltage monitor 72 drops below the third threshold (e.g. 165 volts). The third threshold is set by variable resistor R6 to be greater than the output voltage of the motor 11 operating in a regenerative mode during a power failure, and below voltage levels which occur during normal operation of the hoist. When the input voltage is below the third threshold, the base drive at transistor Q2 will be lost causing that transistor to turn off. This in turn removes voltage from the gate of the output FET Q3 causing this latter transistor to turn off also. When the drain to source voltage across the now turning off output FET Q3 exceeds 100 volts for example, transistor Q1 will receive base current again and turn on. The turning on of transistor Q1 will further reduce the voltage across capacitor C1 by shorting out resistor R4 which reinforces the turn off of transistors Q2 and Q3. Resistor R8 is connected across the base-emitter junction of Q2 to ensure a complete turn off of transistor Q2 when the potential on capacitor C1 is less than the combined breakdown of the series connected base-emitter junction of transistor Q2 and diode D1.

When the output FET Q3 turns off the voltage is removed from the under voltage relay coil 74 which causes the associated relay contacts 76 to open, see FIG. 1. This action shuts off the supply of electric current to the control circuit branched 80–85 which contain the relay coils 86–92, thereby opening the relay contacts connected to the motor 11. Specifically the raise and lower relay contacts 28, 30, and 48 will open as will the resistor tap contacts 1A, 2A and 3A and the master relay contacts 24. The dynamic brake contacts 36 will close. As a consequence, during power failure, the hoist motor 11 is electrically disconnected from the brake actuator 35, i.e. a path does not exist for current generated by the motor 11 to flow through the brake actuator, thus the actuator engages the mechanical brake to stop the descent of the load carried by the crane. The voltage level at which cutout of the under voltage relay contacts 76 occurs is greater than the regeneration voltage produced by the motor during a power failure. Therefore, the regeneration voltage is insufficient to cause the low voltage monitor 72 to maintain the under voltage relay contact 76 in a closed state. The present low voltage monitor 72 is insensitive to normal regeneration voltages in a power outage condition as compared to previous under voltage circuits.

It should be noted that the series connection of the base-emitter junction of transistor Q2 and diode D1 form the voltage reference of the circuit, which therefore is temperature dependent. Although the components of the present circuit can be selected to reduce this effect, one skilled in the art will realize that conventional temperature compensation components may be required to further reduce the temperature dependency should the particular application of the low voltage monitor 72 require greater accuracy.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

We claim:

1. In a control circuit for a motor of a crane that receives voltage from a power supply, the improvement comprising:
    a switch through which electric current flows to control the motor in response to a control signal applied to a control terminal of the switch;
    a monitor circuit which detects whether voltage supplied to the control circuit exceeds a threshold level and responds by producing a sensor signal, wherein the threshold level is greater than a voltage produced by the motor operating in a regenerative mode during failure of the power supply; and
    a switch circuit that responds to the sensor signal by producing the control signal that is applied to the switch.

2. The control circuit as recited in claim 1 wherein the monitor circuit comprises:
    first and second terminals across which is to be applied a voltage proportional to the voltage from a power supply;
    a voltage divider coupled between the first and second terminals, and having a first node;
    a capacitor connected between the first node and the second terminal;
    a first resistor; and
    a Zener diode connected in series with the first resistor between the first node and the second terminal, and defining a second node between the Zener diode and the first resistor wherein voltage at the second node indicates when the voltage supplied to the control circuit exceeds the threshold level.

3. The control circuit as recited in claim 2 wherein the switch circuit comprises an output transistor having a control electrode coupled to the second node, and a conduction path connected between the first node and the control terminal of the switch.

4. The control circuit as recited in claim 2 wherein the switch circuit comprises:
    second and third resistors;
    a first transistor having a first control electrode connected to the second node, and having a conduction path connected in series with the second resistor between the first node and the second terminal, wherein a third node is defined between the first transistor and the second resistor; and
    an output transistor having a second control electrode coupled by the third resistor to the third node, and having a first conduction path connected between the second terminal and control terminal of the switch.

5. The control circuit as recited in claim 1 wherein the switch comprises a relay having a coil that receives the control signal, and having contacts through which the electric current flows to control the motor.

6. A low voltage monitor for a motor of a crane that receives voltage from a power supply, the low voltage monitor comprising:

first and second terminals across which is to be applied a voltage to be monitored;
    an output terminal;
    a first voltage divider coupled between the first and second terminals, and having a first node;
    a capacitor connected between the first node and the second terminal;
    an output transistor having a first control electrode, and a conduction path connected between the second terminal and the output terminal; and
    a transistor drive circuit coupled to the output transistor to apply a voltage to the control electrode in response to a voltage across the capacitor.

7. The low voltage monitor as recited in claim 6 further comprising a relay having a coil connected between the first terminal and the output terminal, and having a set of contacts through which electric current flows to control the motor.

8. The low voltage monitor as recited in claim 6 wherein transistor drive circuit comprises:
    a first resistor;
    a first transistor having a second control electrode and having a second conduction path connected in series with the first resistor between the first node and the second terminal;
    a bias circuit for biasing the second control electrode in response to voltage across the capacitor;
    a second resistor connecting a node between the first resistor and the first transistor to the first control electrode of the output transistor.

9. The low voltage monitor as recited in claim 8 wherein the bias circuit comprises a third resistor and a Zener diode connected in series across the capacitor with a junction between the third resistor and the Zener diode being coupled to the second control electrode.

10. The low voltage monitor as recited in claim 8 wherein the first voltage divider comprises third, fourth and fifth resistors connected in series.

11. The low voltage monitor as recited in claim 10 wherein the third resistor is variable.

12. The low voltage monitor recited in claim 10 wherein the first node is between the third and fourth resistors.

13. The low voltage monitor as recited in claim 12 further comprising a second voltage divider coupled between the output terminal and the second terminal, and having a third node; and a second transistor with a third control electrode connected to the third node and a conduction path connected in parallel with the fifth resistor.

14. A low voltage monitor for a dc series motor of a crane that receives voltage from a power supply, the low voltage monitor comprising:
    first and second terminals across which is to be applied a voltage to be monitored;
    an output terminal;
    a first voltage divider coupled across the first and second terminals, and having first and second nodes between first and second terminals;
    a second voltage divider coupled between the output terminal and the second terminal, and having a third node between the output terminal and the second terminal;
    a first transistor having a first control electrode connected to the third node, and a first conduction path connected between the second node and the second terminal;
    a capacitor connected between the first node and the second terminal;

first and second resistors;

a second transistor having a second control electrode and having a second conduction path connected in series with the first resistor between the first node and the second terminal;

Zener diode connected in series with the second resistor across the capacitor with a junction therebetween being coupled to the second control electrode;

an output transistor having a third control electrode, and a conduction path connected between the second terminal and the output terminal;

a third resistor connected between the third control electrode and another junction between the first resistor and the second transistor; and a relay having a coil connected between the first terminal and the output terminal, and having a set of contacts through which electric current flows to control the dc series motor.

15. The low voltage monitor as recited in claim 14 wherein the first voltage divider comprises third, fourth and fifth resistors connected in series with the first node defined between the third and fourth resistors.

16. The low voltage monitor as recited in claim 15 wherein the first resistor is variable.

17. The low voltage monitor as recited in claim 14 wherein the second voltage divider comprises a pair of resistors connected in series with the third node defined therebetween.

18. A method for controlling a motor of a crane that receives voltage from a power supply, said motor comprising the steps of:

detecting whether the voltage from a power supply exceeds a threshold level in which event a sensor signal is produced, wherein the threshold level is greater than a voltage produced by the motor operating in a regenerative mode during interruption of the voltage from the power supply;

responding to the sensor signal by operating a switch through which electric current flows to control the motor; and operating a mechanical brake when the electric current ceases to flow through the switch wherein operation of the mechanical brake stops movement of a member driven by the motor.

* * * * *